United States Patent [19]

Staebler

[11] 4,450,193
[45] May 22, 1984

[54] MAT ASSEMBLY

[76] Inventor: Raymond Staebler, 411 Zanzibar Pl., Billings, Mont. 59105

[21] Appl. No.: 510,971

[22] Filed: Jul. 5, 1983

[51] Int. Cl.³ .......................... B32B 3/06; B32B 3/18
[52] U.S. Cl. ........................................ 428/71; 428/76; 428/102; 428/193; 428/194; 428/246; 428/906
[58] Field of Search .................. 428/71, 76, 102, 192, 428/193, 194, 246, 906

[56] References Cited

U.S. PATENT DOCUMENTS 4,357,725  11/1982  Ahlm .................................... 428/71
4,359,496  11/1982  Kratel et al. ......................... 428/76

Primary Examiner—William J. Van Balen
Attorney, Agent, or Firm—Arthur L. Urban

[57] ABSTRACT

A mat assembly including a pad portion, a base portion, a face portion, a fastening portion and a securing portion; the pad portion including a foam layer, the foam layer having a thickness between about 3/16th and ⅜th of an inch; the base portion being disposed adjacent to a major surface of the foam layer, the base portion including a flexible laminate including a fabric backing layer in contact with the foam layer and an outer plastic layer integral therewith, the base portion having a length and a width slightly larger than the foam layer so that the base portion extends beyond the periphery of the foam layer on all edges thereof; the face portion being disposed adjacent to a major surface of the foam layer opposite to the base portion, the face portion including a flexible laminate including a fabric backing layer in contact with the foam layer and an outer plastic layer integral therewith, the face portion having a length and a width substantially the same as the base portion and slightly larger than the foam layer with the face portion extending beyond the periphery of the foam layer on all edges thereof, the edges of the face portion being aligned with the edges of the base portion; the fastening portion including means for affixing together the adjacent peripheral sections of the face and base portions that extend beyond the edges of the foam layer; the securing portion including ties extending from one of the shorter edges of the assembly; whereby the mat assembly can be rolled into a cylindrical configuration when not in use and secured by the ties to facilitate storage.

8 Claims, 6 Drawing Figures

U.S. Patent May 22, 1984 4,450,193
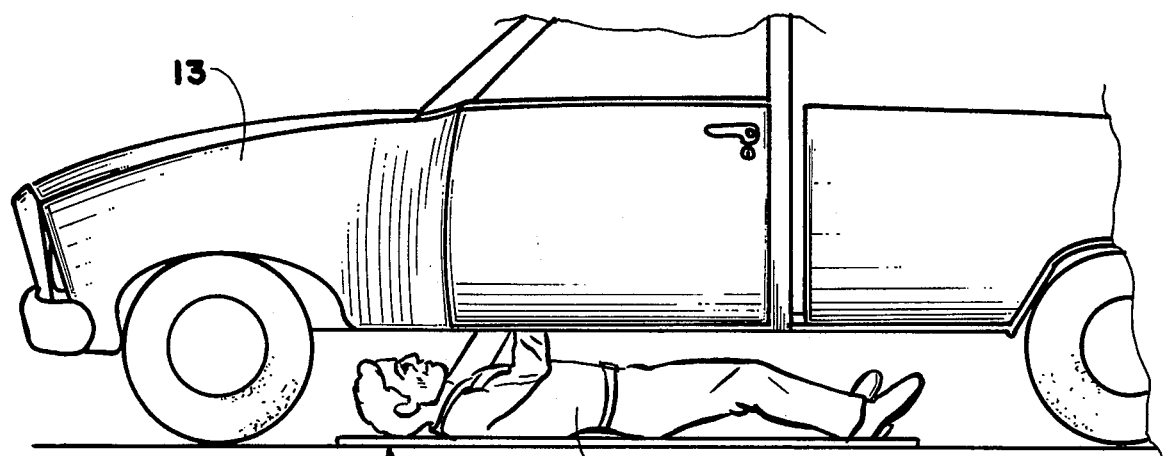
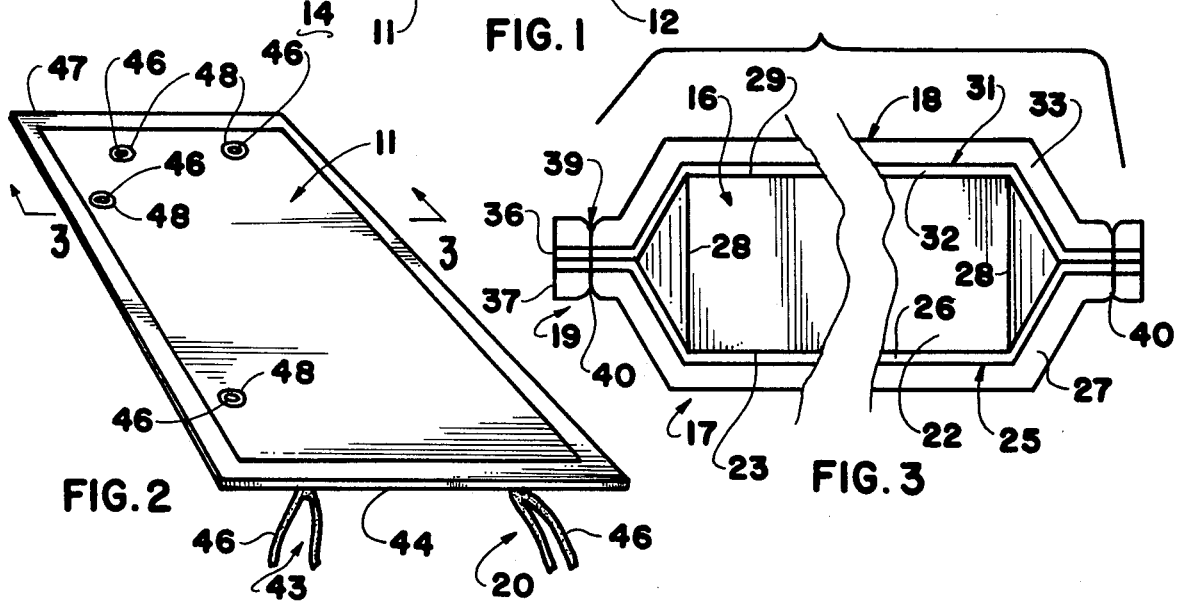
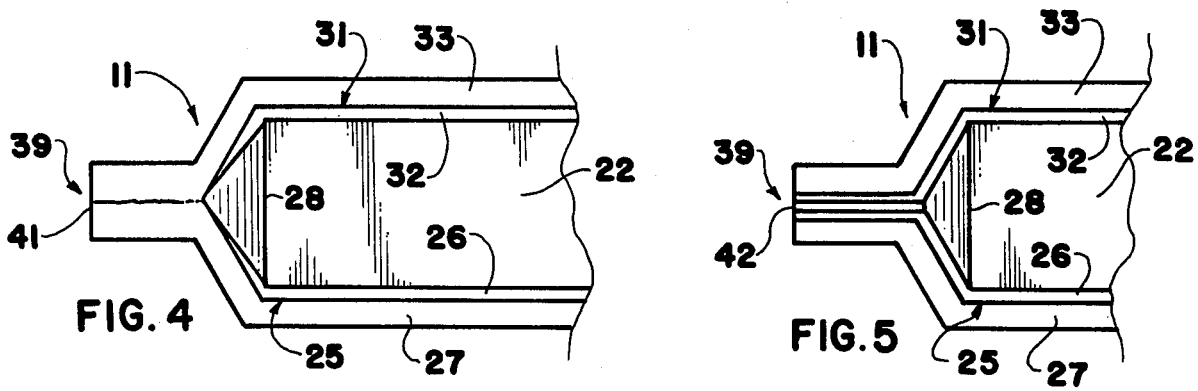
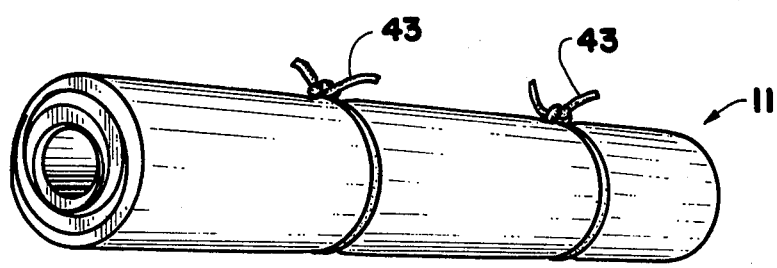

MAT ASSEMBLY

This invention relates to a novel mat assembly and more particularly relates to a new mat assembly on which a person can lie.

Throughout history, man has had to lie down on the ground to perform a variety of tasks. If the ground is clean or covered with grass, the individual lying thereon will not soil his body or clothing. However, if the ground is contaminated or wet, he and/or his clothing will become dirty and/or wet.

Originally, when life was more simple, man accepted the fact that he would become dirty if he was not careful in his selection of a place to sit or lie down. However, as civilization has developed, people have become more conscious of the cleanliness of their bodies and clothing. Clothing is selected more for its aesthetic appearance than its utility.

Under these conditions, clothing is more highly regarded and greater care is exercised in its use. In order to reduce the soiling of clothing and the body when lying on the ground, a person either must be more conscientious in selecting where he sits or lies or else he must provide some protection for his body and clothing.

One way that a person can protect his clothing is to place a piece of heavy paper or cardboard under his body. This expedient is particularly common when a person is required to lie on the ground under some structure such as when working under a vehicle.

While a piece of cardboard may provide body protection in certain situations, under other conditions it may be virtually useless. For example, if the ground is wet from rain or snow or the like, the moisture in or on the ground will wick through the cardboard and the person lying on it will become wet. Even when the ground is not actually wet, dampness still can filter through the cardboard and chill the body.

Another problem encountered when using cardboard or paper is the difficulty in obtaining a ready supply of material. Since the cardboard usually is scrounged from discarded packages, considerable time and effort may be required to obtain suitable material.

Even after the proper cardboard has been obtained, further problems occur. After the cardboard has become soiled and/or soaked, the cardboard must be disposed of which can take additional time and effort. Since the cardboard generally is large in size, it is difficult to find a receptacle of sufficient capacity. If not, the cardboard must be cut or ripped into smaller pieces that will fit the available container or containers. In any case, the disposal of the cardboard after use can be a dirty, unpleasant task.

Instead of using cardboard, some persons may employ an old rug. While a rug may be satisfactory if the ground is dry, under wet conditions, a rug also will absorb moisture and become soaked. Since rugs ordinarily are not discarded as readily as cardboard, the wet rug may have to be laundered periodically or at least the wet rug must be dried.

Drying can be a nuisance because a wet rug generally takes a long time to dry even if it is suspended over a line or support. In addition, a wet rug is very heavy so the support from which the rug is suspended must be quite sturdy.

From the above discussion, it is clear that previous means for protecting a person's body from contact with the ground when working under a vehicle or performing similar tasks are less than satisfactory under many conditions ordinarily encountered. Thus, there is a need for a new mat that can overcome the deficiencies of current and past expedients.

The present invention provides a novel mat assembly. The mat assembly of the present invention overcomes the deficiencies of previous mats. The mat assembly of the invention provides a high degree of protection for a person's body. The mat assembly keeps an individual dry even when the ground is quite wet. Also, the mat assembly protects the body against contamination on the surface. In addition, the mat assembly cushions the body from hard irregular surfaces.

The mat assembly of the invention is simple in design and relatively inexpensive. The mat assembly can be fabricated from commercially available materials and components. Conventional production techniques and procedures can be employed in its manufacture. The mat assembly is durable in construction and has a long useful life.

The mat assembly can be used efficiently with only a minimum of instruction. The mat assembly can be stored conveniently in a relatively small space. The mat assembly can be prepared for reuse quickly. The mat assembly can be slid along the ground easily with a minimum of effort.

These and other benefits and advantages of the novel mat assembly of the present invention will be apparent from the following description and the accompanying drawings in which:

FIG. 1 is a schematic illustration of a mat assembly of the invention in use by a person working under a vehicle;

FIG. 2 is a view in perspective of the mat assembly shown in FIG. 1;

FIG. 3 is an enlarged fragmentary sectional view of the mat assembly shown in FIG. 2 taken along line 3—3 thereof;

FIG. 4 is a fragmentary sectional view of another form of the mat assembly of the invention;

FIG. 5 is a fragmentary sectional view of a different form of the mat assembly of the invention; and FIG. 6 is a view in perspective of the mat assembly shown in FIG. 2 in a rolled configuration.

As shown in FIGS. 1-3 and 6 of the drawings, one form of the mat assembly 11 of the invention may be employed by a person 12 to work under a vehicle 13. The mat assembly 11 is placed on the ground 14 under the vehicle 13 and positioned for the individual 12 to lie on it when he is working under the vehicle.

The mat assembly 11 includes a pad portion 16, a base portion 17, a face portion 18, a fastening portion 19 and a securing portion 20. The pad portion 16 of the mat assembly 11 of the present invention includes a foam layer 22. The foam layer 22 has a length significantly greater than the width thereof. Advantageously, the mat assembly 11 has a length between about 30% and 50% greater than the width of the mat.

The foam layer 22 of the pad portion 16 has a thickness between about 3/16th and ⅜th of an inch. The thickness of the foam layer preferably is approximately ¼th of an inch.

The base portion 17 of the mat assembly 11 of the invention is disposed adjacent to a major surface 23 of the foam layer 22. The base portion 17 includes a flexible laminate 25. The laminate 25 includes a fabric backing layer 26 and an outer plastic layer 27 integral therewith. The fabric layer 26 of the laminate 25 is disposed in contact with the foam layer 22.

The base portion 17 has a length and a width slightly larger than the corresponding dimensions of the form layer 22. This sizing enables the base portion 17 to extend beyond the peripheral edges 28 of the foam layer on all edges thereof.

The face portion 18 of the mat assembly 11 is disposed adjacent to a major surface 29 of the foam layer 22. The face 18 is located opposite to surface 23 of the foam layer that is in contact with the base portion 17.

The face portion 18 includes a flexible laminate 31. The laminate 31 is similar to the laminate 25 of the base portion 17. The laminate 31 includes a fabric backing layer 32 and an outer plastic layer 33. The plastic layer 33 is integrally formed with the fabric layer 32. The fabric layer 32 of the laminate 31 is disposed in contact with the surface 29 of the foam layer 22. Advantageously, the fabric backing layers of the base and face portions 17 and 18 are textile fabrics and preferably knit fabrics.

The face portion 18 has a length and a width substantially the same as the dimensions of the base portion 17. Similarly, the length and width are slightly larger than the corresponding dimensions of the foam layer 22 so the face portion 18 extends beyond the periphery 28 of the foam layer 22 on all edges thereof. The edges 36 of the face portion 18 are aligned with the adjacent edges 37 of the base portion 17.

The fastening portion 19 of the mat assembly 11 of the invention includes means 39 for affixing together the adjacent peripheral sections of the base and face portions 17 and 18 that extend beyond the edges of the foam layer. The fastening means advantageously includes stitching 40 as shown in FIG. 3. Alternatively, the fastening means 39 may include heat sealing 41 (FIG. 4) or an adhesive 42 such as in FIG. 5.

The securing portion 20 of the mat assembly 11 includes tie means 43. The ties 43 extend from one of the short edges 44 of the mat assembly. Preferably, the mat assembly 11 also includes at least one pair of openings 46 adjacent at least one edge 47 of the assembly. As shown in FIG. 3, the mat assembly 11 includes pairs of openings along the top and left edge of the mat.

The mat assembly 11 of the invention is fabricated by cutting a plastic/fabric laminate into two equal sized pieces 17 and 18. Next, a ¼th inch thick foam layer 22 is cut to a size similar to the other pieces but slightly smaller. The foam layer is placed between the two laminate pieces that have been positioned with their fabric layers adjacent to the foam layer and in alignment therewith.

The foam layer is positioned so the edges thereof are spaced inwardly from the laminate edges. Then, the edges of the laminates are fastened together by stitching, heat sealing, an adhesive or the like as shown in FIGS. 3-5 of the drawings. The ties can be secured in place as the edges are being fastened together. If openings 46 are included, grommets 48 can be formed through the mat at the desired locations. Also, suitable designs or logos can be stenciled or similarly placed on the face portion 18 of the mat if desired. The mat 11 can be rolled and secured with ties 43 to facilitate storage.

When it is desired to use the rolled mat 11, the ties 43 are loosened and the mat will unroll into a flat configuration. The mat then is placed on the ground or a similar surface so the user's body can lie on it and be protected from the subsurface. In this way, the body can be kept clean and dry even when the subsurface is wet and/or contaminated. After use, the mat 11 can be rolled again, tied and stored for future use easily and quickly.

The above description and the accompanying drawings show that the present invention provides a novel mat assembly which overcomes the shortcomings of earlier make-shift solutions. The mat assembly of the present invention assists a person in keeping his body and clothes clean and dry when sitting or lying on the ground. This protection of body and clothes is achieved even if the ground is wet and contaminated. Also, the mat assembly smooths and cushions hard, rough, irregular surfaces.

The mat assembly of the present invention is simple in design and can be produced relatively inexpensively using commercially available materials, semi-skilled labor and conventional fabrication procedures. The mat assembly is durable in construction and has a long useful life. The mat can be cleaned by simply wiping with a damp cloth or sponge and dries quickly.

The mat assembly of the invention can be used conveniently by persons of all ages. Little, if any, instruction is required to use the mat efficiently. The mat assembly can be stored in a small space and is ready for use in a minute. The mat assembly can be positioned under an obstacle easily.

It will be apparent that various modifications can be made in the particular mat assembly described in detail above and shown in the drawings within the scope of the invention. The size, configuration and arrangement of components can be different if desired. Also, the outer surfaces of the face and base portions can be changed to meet specific aesthetic and/or utilitarian requirements. In addition, the securing portion can be one of a variety of conventional retaining means. These and other changes can be made in the mat assembly provided the functioning and operation thereof are not adversely affected. Therefore, the scope of the invention is to be limited only by the following claims.

What is claimed is:

1. A mat assembly including a pad portion, a base portion, a face portion, a fastening portion and a securing portion; said pad portion including a foam layer, said foam layer having a thickness between about 3/16th and ⅜th of an inch; said base portion being disposed adjacent to a major surface of said foam layer, said base portion including a flexible laminate including a fabric backing layer in contact with said foam layer and an outer plastic layer integral therewith, said base portion having a length and a width slightly larger than said foam layer so that the base portion extends beyond the periphery of said foam layer on all edges thereof; said face portion being disposed adjacent to a major surface of said foam layer opposite to said base portion, said face portion including a flexible laminate including a fabric backing layer in contact with said foam layer and an outer plastic layer integral therewith, said face portion having a length and a width substantially the same as said base portion and slightly larger than said foam layer with said face portion extending beyond the periphery of said foam layer on all edges thereof, the edges of said face portion being aligned with the edges of said base portion; said fastening portion including means for affixing together the adjacent peripheral sections of said face and base portions that extend beyond the edges of said foam layer; said securing portion including tie means extending from one of the shorter edges of said assembly; whereby said mat assembly can be rolled into a cylindrical configuration when not in use and secured by said tie means to facilitate storage.

2. A mat assembly according to claim 1 wherein said foam layer has a thickness of about ¼th inch.

3. A mat assembly according to claim 1 wherein said fabric backing layers of said base and face portions are knit fabrics.

4. A mat assembly according to claim 1 including at least one pair of openings adjacent at least one edge of said assembly.

5. A mat assembly according to claim 1 wherein said fastening portion includes stitching.

6. A mat assembly according to claim 1 wherein said fastening portion includes heat sealed sections.

7. A mat assembly according to claim 1 wherein said fastening portion includes an adhesive.

8. A mat assembly according to claim 1 wherein said assembly has a length about 30% to 50% greater than the width thereof.

* * * * *